(12) United States Patent
Finkl et al.

(10) Patent No.: US 10,272,889 B2
(45) Date of Patent: Apr. 30, 2019

(54) BRAKE SYSTEM FOR A VEHICLE, AND METHOD FOR OPERATING A BRAKE SYSTEM FOR A VEHICLE

(71) Applicant: KNORR-BREMSE Systeme fuer Nutzfahrzeuge GmbH, Munich (DE)

(72) Inventors: Florian Finkl, Munich (DE); Andreas Buch, Taufkirchen (DE); Michael Herges, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 96 days.

(21) Appl. No.: 15/650,009

(22) Filed: Jul. 14, 2017

(65) Prior Publication Data

US 2017/0313290 A1 Nov. 2, 2017

Related U.S. Application Data

(63) Continuation of application No. PCT/EP2015/080129, filed on Dec. 17, 2015.

(30) Foreign Application Priority Data

Jan. 16, 2015 (DE) .......................... 10 2015 000 594

(51) Int. Cl.
*B60T 8/17* (2006.01)
*B60T 11/34* (2006.01)
(Continued)

(52) U.S. Cl.
CPC ................ *B60T 8/17* (2013.01); *B60T 7/042* (2013.01); *B60T 8/326* (2013.01); *B60T 8/327* (2013.01);
(Continued)

(58) Field of Classification Search
CPC ........ B60T 11/345; B60T 11/08; B60T 11/34; B60T 17/221; B60T 7/042; B60T 8/327;
(Continued)

(56) References Cited

U.S. PATENT DOCUMENTS 3,640,067 A * 2/1972 Ingram ................... B60T 11/10
188/345
4,402,478 A * 9/1983 Martin .................. B60T 8/1703
188/16
(Continued)

FOREIGN PATENT DOCUMENTS

DE  32 08 393 A1  9/1983
DE  37 19 821 A1  12/1988
(Continued)

OTHER PUBLICATIONS

International Preliminary Report on Patentability (PCT/IB/326, PCT/IB/338 & PCT/IB/373) issued in PCT Application No. PCT/EP2015/080129 dated Jul. 27, 2017, including English translation of document C2 (German-language Written Opinion (PCT/ISA/237)) previously filed on Jul. 14, 2017 (10 pages).
(Continued)

*Primary Examiner* — Robert A. Siconolfi
*Assistant Examiner* — San M Aung
(74) *Attorney, Agent, or Firm* — Crowell & Moring LLP

(57) ABSTRACT

A brake system for a vehicle includes a first brake device for braking a first wheel of the vehicle, a second brake device for braking a second wheel of the vehicle, a first brake pedal which is paired with the first wheel, a second brake pedal which is paired with the second wheel, a brake control valve which is designed to act on the first brake device and/or the second brake device, a first control valve for controlling a brake pressure in the first brake device, and a second control valve for controlling a brake pressure in the second brake
(Continued)

device. The brake system further has an electromechanical switching module in order to block or at least reduce a braking effect of the second brake device while the first brake pedal is being actuated, and the switching module is designed to block or at least reduce a braking effect of the first brake device while the second brake pedal is being actuated.

14 Claims, 4 Drawing Sheets

(51) Int. Cl.
*B60T 8/34* (2006.01)
*B60T 8/32* (2006.01)
*B60T 15/02* (2006.01)
*B60T 7/04* (2006.01)
*B60T 11/21* (2006.01)
*B60T 13/66* (2006.01)

(52) U.S. Cl.
CPC ............... *B60T 8/341* (2013.01); *B60T 11/21* (2013.01); *B60T 11/34* (2013.01); *B60T 15/025* (2013.01); *B60T 13/665* (2013.01)

(58) Field of Classification Search
CPC ........ B60T 8/341; B60T 8/326; B60T 13/665; B60T 13/745; B62D 11/08
USPC .................................. 303/125, 9.61; 188/345
See application file for complete search history.

(56) References Cited

U.S. PATENT DOCUMENTS

| 4,475,773 | A | | 10/1984 | Bartscher et al. |
| 4,479,563 | A | * | 10/1984 | Horsch .................. B62D 11/08 180/6.7 |
| 6,324,457 | B1 | * | 11/2001 | Minowa ................. B60K 26/02 180/170 |
| 2003/0071517 | A1 | | 4/2003 | Weil |
| 2003/0089535 | A1 | * | 5/2003 | Kanzler .................... B60T 8/00 180/9.44 |
| 2004/0239173 | A1 | | 12/2004 | Williams et al. |
| 2011/0049970 | A1 | | 3/2011 | Hironaka |
| 2012/0062022 | A1 | * | 3/2012 | Heren ..................... B60T 11/21 303/2 |
| 2012/0080935 | A1 | | 4/2012 | Steinberger et al. |

FOREIGN PATENT DOCUMENTS

| DE | 91 09 200 U1 | 9/1991 |
| DE | 101 45 789 A1 | 4/2003 |
| EP | 0 295 396 B1 | 7/1992 |
| WO | WO 2010/094481 A2 | 8/2010 |

OTHER PUBLICATIONS

International Search Report (PCT/ISA/210) issued in PCT Application No. PCT/EP2015/080129 dated Apr. 18, 2016 with English translation (Four (4) pages).
German-language Written Opinion (PCT/ISA/237) issued in PCT Application No. PCT/EP2015/080129 dated Apr. 18, 2016 (Seven (7) pages).
German-language Office Action issued in counterpart German Application No. 10 2015 000 594.4 dated Oct. 20, 2015 (Six (6) pages).

* cited by examiner

BRAKE SYSTEM FOR A VEHICLE, AND METHOD FOR OPERATING A BRAKE SYSTEM FOR A VEHICLE

CROSS REFERENCE TO RELATED APPLICATIONS

This application is a continuation of PCT International Application No. PCT/EP2015/080129, filed Dec. 17, 2015, which claims priority under 35 U.S.C. § 119 from German Patent Application No. 10 2015 000 594.4, filed Jan. 16, 2015, the entire disclosures of which are herein expressly incorporated by reference.

BACKGROUND AND SUMMARY OF THE INVENTION

The present invention concerns a brake system for a vehicle and a method for operating a brake system for a vehicle.

In particular, agricultural vehicles can have a mechanically operated steering brake function. The steering brake function can, for example, be implemented by a dual-circuit, parallel operated brake control valve (which, for example, is implemented as a foot-operated brake valve) with a brake circuit separation into a left and a right brake circuit relative to the longitudinal axis of the vehicle and two foot-operated brake pedals. Alternatively, two separate mechanical controllers can be provided for applying pressure to the left or right rear wheel.

Furthermore, solutions for implementing a steering brake function are known, with which one or more electrical pressure control valves or shut-off valves are actuated by one or more electronic control units depending on different input information.

It is the object of the present invention to provide an improved steering brake function for a vehicle.

This object is achieved by a brake system for a vehicle and a method for operating a brake system for a vehicle according embodiments of the invention.

The approach proposed here provides a brake system for a vehicle, wherein the brake system comprises the following features:

a pneumatically and/or hydraulically operated first brake device for braking the first wheel of the vehicle;

a pneumatically and/or hydraulically operated second brake device for braking the second wheel of the vehicle;

a first brake pedal associated with the first wheel;

a second brake pedal associated with the second wheel;

a brake control valve that is designed to apply a pneumatic and/or hydraulic brake pressure to the first brake device and/or the second brake device when the first brake pedal and/or the second brake pedal is operated;

a first control valve for controlling the brake pressure in the first brake device;

a second control valve for controlling the brake pressure in the second brake device; and an electromechanical switch module actuated by the first brake pedal and/or the second brake pedal, which is designed to activate the second control valve when the first brake pedal is actuated in order to remove or at least to reduce a braking effect of the second brake device, and/or to activate the first control valve when the second brake pedal is actuated in order to remove or at least reduce a braking effect of the first brake device.

The two brake devices can be implemented as disk brakes or drum brakes, for example. A vehicle can be a motor vehicle, in particular a commercial vehicle such as an agricultural vehicle, for example. The brake devices can be part of a rear wheel brake of the vehicle, for example. The first wheel and the second wheel can be disposed on different sides of the vehicle. For example, the two wheels can be coupled to each other by a differential gearbox. A brake control valve can be a valve that can be operated (for example by the two brake pedals), which is designed to produce either a pneumatic or a hydraulic brake pressure or both a pneumatic and also a hydraulic brake pressure in at least one of the two brake devices depending on a respective actuation travel of the brake pedals.

Depending on the embodiment, the brake devices can be coupled to the brake control valve via one or more brake circuits. The brake pedals can be operated independently of each other when the steering brake function is activated. When the steering brake function is not activated, the brake pedals can be coupled to each other mechanically. The two brake devices can each be connected to the brake control valve via at least one control valve. A control valve can, for example, be a pressure control valve or a shut-off valve, which prevents brake pressure from being applied to the respective brake device when in the activated state, so that the brake device is not activated or the brake force thereof is at least reduced despite the brake pedal being depressed. The two control valves can be electrically actuated and each can be connected to the electromechanical switch module. The electromechanical switch module can, for example, be a logic circuit with two mechanically operated switches, each of which can be mechanically coupled to one of the two brake pedals. The electromechanical switch module can, for example, be connected to a voltage source when the steering brake function is activated, so that a voltage is applied to the second control valve when the first switch is actuated by the first brake pedal or the voltage is applied to the first control valve when the second switch is actuated by the second brake pedal.

The approach presented here is based on the knowledge that it is possible to implement a steering brake function of the vehicle using an electromechanical switch module coupled to two brake pedals.

As a result, a steering brake function can also be implemented in the event of a brake circuit separation between front and rear axles or in the case of brake circuits that are disposed or operated in series, without an electrical control unit being necessary for logical control of the steering brake function.

For example, the switch module can be implemented such that only the opposite wheel is braked when an individual brake pedal is actuated by suitably shutting off or venting a brake line to a left or right rear wheel brake, and possibly a brake line to a front wheel brake. Thus, for example, the turning radius of the vehicle is reduced or a directional correction is carried out, for example during field work.

In the case of a vehicle with two brake pedals for actuating the single-circuit brake control valve or the dual-circuit brake control valve with serial brake circuits, as a rule all wheel brakes are subjected to pressure, and this is independent of which brake pedal is operated by the driver.

The steering brake function can also be implemented without the use of the control unit when using single-circuit brake control valves or dual-circuit brake control valves disposed in series by coupling the respective pressure control valves of the wheel brakes to the brake pedals by means of a simple electrical logic circuit. Such a circuit gives the advantage of low manufacturing costs and a high degree of robustness against ambient influences.

According to one embodiment, the brake system can comprise at least a first brake circuit and a second brake circuit. The brake control valve can be implemented to apply the brake pressure to the first brake device either via the first or the second brake circuit or via both brake circuits. The brake control valve can be implemented to further apply the brake pressure to the second brake device either via the first or the second brake circuit or via both brake circuits. In particular, the first and the second brake circuits can be connected in series. A brake circuit can mean a line circuit for passing the brake pressure into at least one of the two brake devices. The brake circuits can be mutually independent. By the use of two brake circuits, the probability of the total failure of the brake system can be reduced.

It is advantageous if the brake system comprises at least one pneumatically and/or hydraulically operated further brake device for braking at least one further wheel of the vehicle and at least one further control valve for controlling the brake pressure in the further brake device. In this case, the brake control valve can be designed to also apply the brake pressure to the further brake device when at least one of the two brake pedals is actuated. Accordingly, the switch module can be implemented to also activate the further control valve when at least one of the two brake pedals is actuated in order to remove or at least reduce a braking effect of the further brake device. The further brake device can be a front wheel brake of the vehicle, for example. As a result, the steering brake function can be implemented with low added cost, even in the case of using more than two brake devices.

According to a further embodiment, the brake control valve can be implemented to apply the brake pressure to the first brake device via the first brake circuit. In addition or alternatively, the brake control valve can be implemented to apply the brake pressure to the second brake device via the second brake circuit. As a result, the first and the second brake devices can be subjected to the brake pressure independently of each other, so that in the event of a failure of one brake device, the other brake device continues to be operational. For example, a circuit separation between left and right sides of the vehicle can be achieved with said embodiment.

It is further of advantage if the switch module comprises a first control port that is electrically conductively connected to the first control valve, a second control port that is electrically conductively connected to the second control valve, a supply port for applying a supply voltage, a first switch that is mechanically coupled to the first brake pedal and a second switch that is mechanically coupled to the second brake pedal. In this case, the first switch can be implemented to electrically conductively connect the second control port to the supply port when the first brake pedal is actuated in order to activate the second control valve. Similarly, the second switch can be implemented to electrically conductively connect the first control port to the supply port when the second brake pedal is actuated in order to activate the first control valve. To apply the supply voltage, the supply port can be coupled to the voltage source. Such a switch module can be provided particularly inexpensively and gives the advantage of high reliability owing to the simple mechanical embodiment thereof. As a result of the actuation of the switch being carried out in a purely mechanical way, the use of the control unit can be dispensed with, whereby the manufacturing costs of the brake system can be reduced.

The switch module can comprise at least one further control port that is electrically conductively connected to the further control valve and, in addition or alternatively, to a trailer control valve for controlling the brake pressure in a pneumatically and/or hydraulically operated trailer brake device for braking the trailer of the vehicle. In this case, the first switch can be implemented to electrically conductively connect the further control port to the supply port when the first brake pedal is actuated. The second switch can be implemented to electrically conductively connect the further control port to the supply port when the second brake pedal is actuated. Depending on the embodiment, when connecting the supply port to the further control port, either the further control valve or the trailer control valve or both the further control valve and also the trailer control valve can be activated to remove or at least reduce a braking effect of the further brake device or the trailer brake device. As a result, the switch module can be used for actuating a plurality of control valves at low additional cost.

The brake system can be provided with at least one trailer switch that is disposed between the further control port and the trailer control valve for controlling a voltage supply of the trailer control valve. The trailer switch can, for example, be a relay or another electromechanical switch. For example, the trailer switch can be operated by a driver of the vehicle. By means of the trailer switch, a voltage supply of the trailer control valve can be interrupted independently of a position of the first and second switches. As a result, it can be ensured that the trailer can also be braked when the steering brake function is activated.

The switch module can be implemented in a particularly simple, reliable and inexpensive version if a first diode with a conducting direction from the first control port to the further control port is disposed between the first control port and the further control port and a second diode with a conducting direction from the second control port to the further control port is disposed between the second control port and the further control port. In this case, the first control port, the second control port and the further control port can be connected in series. By means of the diodes, it can be prevented that the supply voltage is applied to the first and the second control ports at the same time and thus that the first and the second control valves are activated at the same time, i.e., by means of the diodes it is guaranteed that the supply voltage is either only applied to the first and further control ports or only to the second and further control ports.

Furthermore, the first and the second switches can be connected in series. The second switch can be implemented to electrically conductively connect the second control port to the first switch in a rest position of the second brake pedal. The first switch can be implemented to electrically conductively connect the first control port to the second switch in a rest position of the first brake pedal. A rest position can be a position of the brake pedal when the brake system is not activated. This embodiment enables at least the second control port to be coupled to the supply port owing to the sole actuation of the first switch and at least the first control port to be coupled to the supply port owing to the sole actuation of the second switch. This enables additional measures for synchronizing the two switches to be omitted.

According to a further embodiment, the brake system can comprise a control unit for controlling a voltage supply of the switch module. In particular, the control unit can be implemented to interrupt the voltage supply if the vehicle exceeds a predetermined speed. Depending on the embodiment, the control unit can, in addition or alternatively, be implemented to interrupt the voltage supply if the vehicle exceeds a predetermined tilt angle, a differential lock of the vehicle is activated or a trailer is coupled to the vehicle. As a result, the driving stability of the vehicle can be increased when the steering brake function is activated.

A control unit can be an electrical unit that processes sensor signals and depending thereon outputs control and/or data signals. The control unit can have an interface that can be implemented in hardware and/or software. In the case of a hardware implementation, the interfaces can be, for example, part of the so-called system ASIC, which contains diverse functions of the control unit. It is however also possible that the interfaces are dedicated integrated circuits or at least partly consist of discrete components. In the case of a software implementation, the interfaces can be software modules that are present in a microcontroller with other software modules, for example.

Finally, the approach presented here provides a method for operating a brake system according to any one of the embodiments. The method comprises a step of outputting the control signal to the second control valve through the switch module if the first brake pedal is actuated in order to remove or at least reduce the braking effect of the second brake device. In addition or alternatively, in the outputting step a control signal can be output to the first control valve through the switch module if the second brake pedal is actuated in order to remove or at least reduce the braking effect of the first brake device.

Other objects, advantages and novel features of the present invention will become apparent from the following detailed description of one or more preferred embodiments when considered in conjunction with the accompanying drawings.

BRIEF DESCRIPTION OF THE DRAWINGS

In the following description of the preferred exemplary embodiments of the present invention, the same or similar reference characters are used for similarly acting elements that are represented in the different figures, wherein a repeated description of said elements is omitted.

DETAILED DESCRIPTION OF THE DRAWINGS

Figure 1:
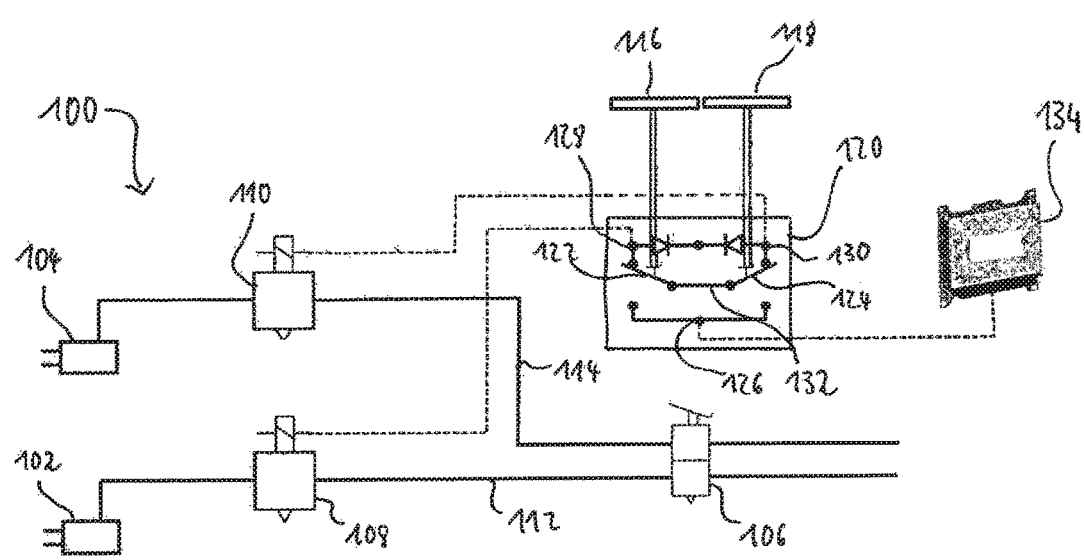
FIG. 1 is a schematic representation of a brake system with two brake devices according to an exemplary embodiment of the present invention.

FIG. 1 shows a schematic representation of a brake system 100 with two brake devices 102, 104 according to an exemplary embodiment of the present invention. In this case, the first brake device 102 is used for braking the first wheel of the vehicle, here a left rear wheel, and the second brake device 104 is used for braking the second wheel of the vehicle, here a right rear wheel. By way of example, the two brake devices 102, 104 are pneumatically operated according to FIG. 1. Alternatively however, the brake devices 102, 104 can also be hydraulically operated or both hydraulically and pneumatically operated.

A brake control valve 106 is pneumatically coupled to the first brake device 102 via a first control valve 108 and to the second brake device 104 via a second control valve 110. In this case, the first brake device 102 and the first control valve 108 are connected to the brake control valve 106 via a first brake circuit 112 and the second brake device 104 and the second control valve 110 is connected to the brake control valve 106 via a second brake circuit 114. The brake system 100 thus has a circuit separation between left and right longitudinal sides of the vehicle, here by way of example between the left and right rear wheels. For example, the two brake circuits 112, 114 are connected together in series by the brake control valve 106.

The brake control valve 106 is coupled to a first brake pedal 116 associated with the left rear wheel and to a second brake pedal 118 associated with the right rear wheel. The brake pedals 116, 118 can also, but do not have to, act as actuation elements of the brake control valve 106. For example, the brake control valve 106 is also implemented to apply a pneumatic brake pressure to both brake circuits 112, 114 if at least one of the two brake pedals 116, 118 is actuated, so that both brake devices 102, 104 are activated by way of the brake pressure. In this case, the brake pressure can depend on a respective actuation travel of the brake pedals 116, 118. It is alternatively also contemplated for the brake pedals 116 and 118 to be provided separately from a foot-operated brake pedal as a brake control valve 106.

As a result of the two brake circuits 112, 114 being disposed in series by way of the brake control valve 106, the brake devices 102, 104 are subjected to the brake pressure both in the event of separate actuation and also in the event of common actuation of the brake pedals 116, 118. In order to enable only the first brake device 102 to be activated, and thereby only the first wheel, i.e. the left rear wheel, to be braked in the event of actuation of the first brake pedal 116, and only the second brake device 104 to be activated and thereby only the second wheel, i.e. the right rear wheel, to be braked in the event of actuation of the second brake pedal 118, the brake pedals 116, 118 are connected to an electromechanical switch module 120 for actuating the control valves 108, 110.

For implementing such a steering brake function in the case of left/right circuit separation, the switch module 120 according to said exemplary embodiment comprises a first switch 122 mechanically coupled to the first brake pedal 116 and a second switch 124 mechanically coupled to the second brake pedal 118. Furthermore, the switch module 120 has a supply port 126 for applying a supply voltage, a first control port 128 electrically conductively connected to the first control valve 108 and a second control port 130 electrically conductively connected to the second control valve 110. The two switches 122, 124 are connected together in series by means of a connecting line 132. The voltage supply of the supply port 126 is, for example, turned on when the steering brake function is activated. The turning on can either be carried out automatically, for example if the two brake pedals 116, 118 are mechanically decoupled from each other, or even manually by actuation of the function switch that is associated with the steering brake function.

In FIG. 1, the two brake pedals 116, 118 are each shown in a rest position. In this case, the first control port 128 is connected to the connecting line 132 via the first switch 122 and the second control port 130 is connected to the connecting line 132 via the second switch 124. If the first brake pedal 116 is actuated, then the first switch 122 is moved by the first brake pedal 116 into a position in which the connecting line 132 is electrically conductively connected to the supply port 126, whereby the supply voltage is applied to the second control port 130 if the steering brake function is activated. The second control valve 110 can, for example, be implemented to shut off the second brake circuit 114 when the supply voltage is applied to the second control port 130 so that the second brake device 104 is no longer subjected to the brake pressure or at least is subjected to a reduced brake pressure. In this way, it is achieved that when the first brake pedal is actuated 116 only the first brake device 102 is activated, i.e. only the left rear wheel is braked. Similarly, the second switch 124 is used to connect the connecting line 132 to the supply port 126 when the second brake pedal 118 is actuated, so that the supply voltage is applied to the first control port 128 and accordingly the first control valve 108 is activated.

According to the exemplary embodiment shown in FIG. 1, the supply port 126 is connected to a control unit 134 that is designed to control the voltage supply of the switch module 120, as described in greater detail below.

The brake system 100 is, for example, implemented as a brake system with a left/right circuit separation and a dual-circuit brake control valve 106 for serial application of pressure to the two brake circuits 112, 114.

The vehicle includes a left brake pedal 116 and a right brake pedal 118 that are mechanically coupled to each other in the normal driving state. Each of the pedals 116, 118 is coupled to a dedicated electrical switch 122, 124, which is closed when the respective pedal associated therewith is actuated. If a single pedal is actuated in this driving state, then the brake control valve 106 is actuated, whereby both brake circuits 112, 114 are subjected to pressure.

The control unit 134 can be implemented to interrupt the voltage supply on exceeding a certain vehicle speed or if the steering brake function is deactivated by a driver.

If the mechanical coupling of the two pedals 116, 118 is unintentionally not carried out by the driver or another device, then both brake circuits 112, 114 are also subjected to pressure by the brake control valve 106 if only one of the two pedals 116, 118 is actuated.

If the steering brake function is activated, then for example when the left brake pedal 116 is actuated the left electrical switch 122 is closed and, depending on the actuation travel of the pedal 116, at the same time a pressure is controlled by the brake control valve 106. By closing the left electrical switch 122, the second control valve 110, which functions as a pressure control valve or shut-off valve for example, is activated by means of the logic circuit 120, also known as the switch module, and by means of an electrical line that is connected to the arrangement for the right rear wheel brake 104. As a result, the brake line of the second brake circuit is vented, i.e. the connection of the right rear wheel brake 104 to the brake control valve 106 is broken.

At the same time, depending on the pedal travel of the left brake pedal 116, a corresponding pressure is passed by the brake control valve 106 to the left rear wheel brake 102 via the brake line of the first brake circuit 112 and the corresponding wheel is braked.

The described arrangement can be used similarly for vehicles with a circuit separation between front and rear wheel brakes, as indicated below using FIGS. 2 through 3B.

Figure 2:
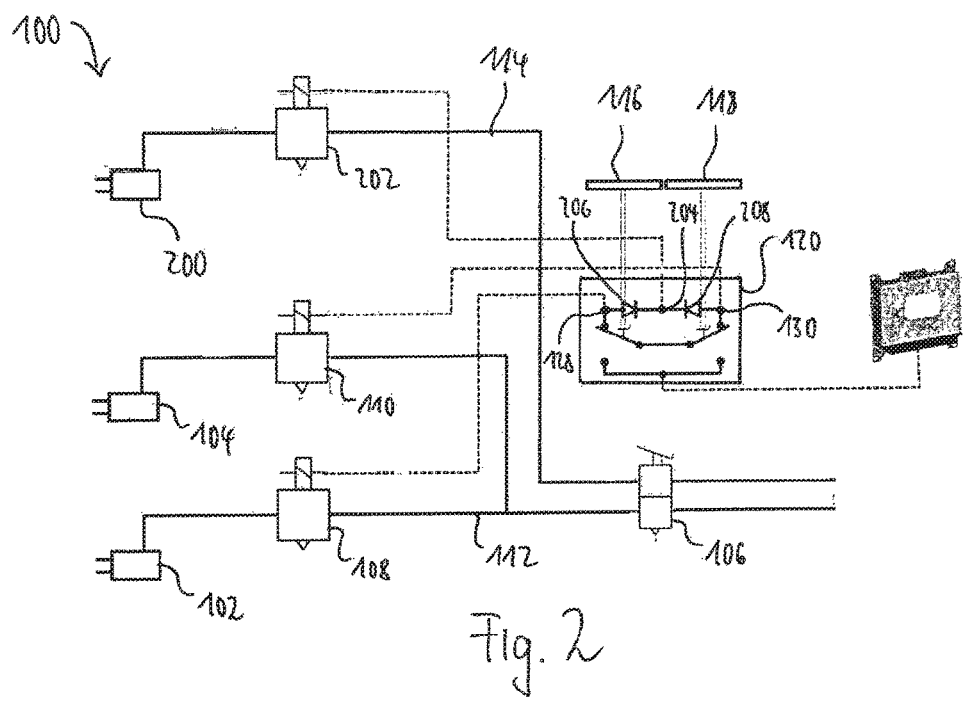
FIG. 2 is a schematic representation of a brake system with three brake devices according to an exemplary embodiment of the present invention.

FIG. 2 shows a schematic representation of a brake system 100 with three brake devices 102, 104, 200 according to an exemplary embodiment of the present invention. The brake system 100 shown in FIG. 2 essentially corresponds to the brake system described using FIG. 1. In contrast to FIG. 1, the brake system 100 includes a further brake device 200, here by way of example a front wheel brake, which is connected to the brake control valve 106 by means of the second brake circuit 114. In this case, the first brake device 102 and the second brake device 104 are each connected to the brake control valve 106 by means of the first brake circuit 112. The brake system 100 thereby has a circuit separation between the front and the rear.

A further control valve 202 is disposed between the further brake device 200 and the brake control valve 106, being implemented similarly to the two control valves 108, 110 in order to vent the second brake circuit 114 when in the activated state. For this purpose, the further control valve 202 is electrically conductively connected to a further control port 204 of the switch module 120. According to this exemplary embodiment, the further control port 204 is disposed between the first control port 128 and the second control port 130. In order to prevent the supply voltage from being applied to the first control port 128 and to the second control port 130 at the same time, the first control port 128 is isolated from the further control port 204 by a first diode 206 and the second control port 130 is isolated from the further control port 204 by a second diode 208, wherein the two diodes 206, 208 are of different polarity. Using such an arrangement, it is achieved that the further control valve 202 is activated in addition to the second control valve 110 if the first brake pedal 116 is actuated, or is activated in addition to the first control valve 108 if the second brake pedal 118 is actuated.

Figure 3A:
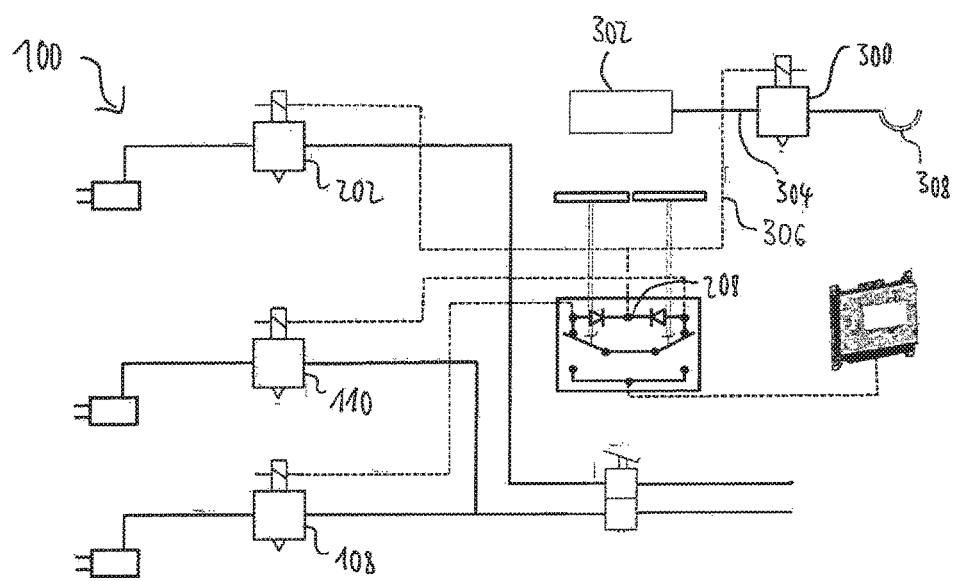
FIGS. 3A and 3B are schematic representations of a brake system with trailer interfaces according to a different exemplary embodiment of the present invention.
Figure 3B:
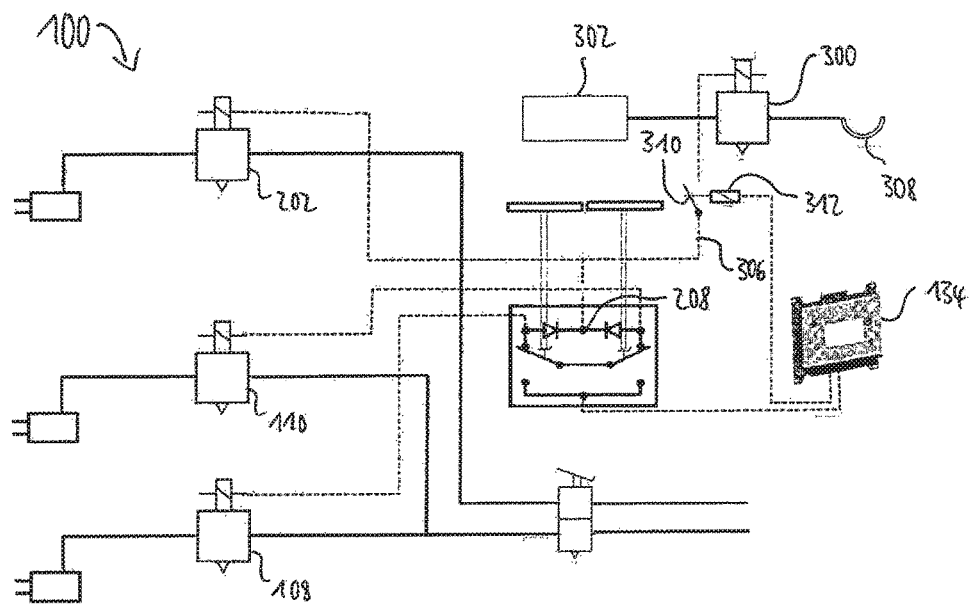

FIGS. 3A and 3B show schematic representations of a brake system 100 with trailer interfaces according to different exemplary embodiments of the present invention. The brake system 100 is, for example, a brake system as has been previously described using FIG. 2, with the difference that the further control port 204 is additionally connected to a trailer control valve 300 for controlling a trailer brake device 302, which is used to brake a trailer coupled to the vehicle. The trailer control valve 300 is implemented similarly to the previously described control valves 108, 110, 202 in order to vent a trailer brake circuit 304 when the supply voltage is applied to the further control port 208, and thus to deactivate the trailer brake device 302 or at least to reduce a brake force exerted on the trailer by the trailer brake device 302.

According to an exemplary embodiment, an additional control or shut-off valve as a trailer control valve 300 can be actuated by means of a further electrical circuit 306 similarly to or in parallel with the electrical circuit for the front axle. The trailer control valve 300 thus prevents actuation of the trailer brake device 302, for example a service brake of the trailer. This can be carried out for example by shutting off the control pressure or control pressures to a brake valve of the trailer brake device or directly by shutting off the control signal to the trailer by means of the trailer control valve 300, for example to a yellow coupling head 308. As a result of said arrangement, inter alia braking of the trailer with the steering brake active can be avoided.

FIG. 3A shows a steering brake function without braking of the trailer. The brake system 100 can however also be implemented with a switchable trailer interface, as shown in FIG. 3B. For this purpose, the electrical circuit 306 comprises a trailer switch 310, which for example can be switched by an electrical relay 312. According to this exemplary embodiment, the relay 312 can be actuated by the control unit 134. The control unit 134 can be implemented to open the electrical circuit 306 by means of the relay 312 despite the steering brake being active, and thus to inhibit shutting off of the control pressure to the trailer, whereby the trailer is braked. For example, the control unit 134 be can implemented to open the trailer switch 310 in response to exceeding a predefined vehicle speed. As a result, it is achieved that the trailer is basically braked on exceeding the predefined vehicle speed.

Figure 4:
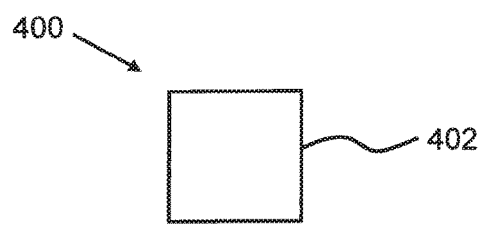
FIG. 4 is a flow chart of the method for operating a brake system according to an exemplary embodiment of the present invention.

FIG. 4 shows a flow chart of the method 400 for operating a brake system according to an exemplary embodiment of the present invention, for example a brake system such as has been described above using FIGS. 1 through 3B. The method 400 includes a step 402 in which a control signal is output to the second control valve disposed between the second brake device and the brake control valve if the first brake pedal is actuated. The control signal is, for example, produced by actuating the switch of the switch module that is mechanically coupled to the first brake pedal. The second control valve is implemented to shut off or to vent a brake line connecting the second brake device to the brake control valve using the control signal such that a braking effect of the second brake device is removed or at least reduced.

Depending on the embodiment, in addition or alternatively a control signal is output to the first control valve disposed between the first brake device and the brake control valve in the step 402 if the second brake pedal is actuated. Also in this case, the control signal can be produced by actuating the switch of the switch module that is mechanically coupled to the second brake pedal. Similarly to the second control valve, the first control valve is implemented to shut off or to vent a brake line connecting the first brake device to the brake control valve using the control signal such that a braking effect of the first brake device is removed or at least reduced.

According to an exemplary embodiment, the method 400 is used for implementing a steering brake function for a vehicle, in particular for an agricultural vehicle. The vehicle can have any desired type of brake system, a single-circuit or dual-circuit brake control valve with any desired medium and two foot-operated brake pedals for actuation of the service brake. The steering brake control is implemented with two electrical pedal switches in combination with a simple electrical circuit, wherein depending on the embodiment, the switch is used to actuate a plurality of pressure control valves, directional control valves or shut-off valves.

Optionally, the electrical circuit additionally includes one or more pressure control valves, directional control valves or shut-off valves in order to prevent braking of the trailer when the steering brake is active. For example, the electrical circuit, which is used to switch said valves, can be connected to an additional electrical relay in order to prevent braking of the trailer when the steering brake is active. For this purpose, the electrical relay can be actuated or controlled by any desired control unit.

According to a further exemplary embodiment, the steering brake function can be deactivated by turning off a voltage supply by means of the electrical switch and, in addition or alternatively, by an external control unit.

Furthermore, it is contemplated that the steering brake function is activated on activating a differential lock on the rear axle or front axle or that the steering brake function must be re-activated following a restart of the vehicle or when the driver turns on the ignition.

Depending on the embodiment, the steering brake function can be deactivated on exceeding a predefined vehicle speed, on exceeding a predefined tilt angle of the vehicle in the longitudinal direction or the lateral direction or on detecting the coupled trailer. In addition or alternatively, the steering brake function can be deactivated by the actuation of the switch by the driver.

The described exemplary embodiments are only chosen by way of example and can be combined with each other.

REFERENCE CHARACTER LIST 100 brake system
102 first brake device
104 second brake device
106 brake control valve
108 first control valve
110 second control valve
112 first brake circuit
114 second brake circuit
116 first brake pedal
118 second brake pedal
120 electromechanical switch module
122 first switch
124 second switch
126 supply port
128 first control port
130 second control port
132 connecting line
134 control unit
200 further brake device
202 further control valve
204 further control port
206 first diode
208 second diode
300 trailer control valve
302 trailer brake device
304 trailer brake circuit
306 electrical circuit
308 coupling head
310 trailer switch
312 relay
400 method for operating a brake system
402 outputting the control signal by the switch module The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake system for a vehicle, comprising:
   a pneumatically and/or hydraulically operated first brake device for braking a first wheel of the vehicle;
   a pneumatically and/or hydraulically operated second brake device for braking a second wheel of the vehicle;
   a first brake pedal associated with the first wheel;
   a second brake pedal associated with the second wheel;
   a brake control valve configured to apply a pneumatic and/or hydraulic brake pressure to the first brake device and/or the second brake device when the first brake pedal and/or the second brake pedal is actuated;
   a first control valve for controlling the brake pressure in the first brake device;
   a second control valve for controlling the brake pressure in the second brake device; and
   an electromechanical switch module actuatable by the first brake pedal and/or the second brake pedal and configured to activate the second control valve when the first brake pedal is actuated in order to remove or at least reduce a braking effect of the second brake device, and/or to activate the first control valve when the second brake pedal is actuated in order to remove or at least reduce a braking effect of the first brake device.

2. The brake system as claimed in claim 1, further comprising at least a first brake circuit and a second brake circuit, wherein
   the brake control valve is implemented to apply the brake pressure to the first brake device via the first brake circuit and/or the second brake circuit and to apply the brake pressure to the second brake device via the first brake circuit and/or the second brake circuit, and the first brake circuit and the second brake circuit are connected in series.

3. The brake system as claimed in claim 1, further comprising:

at least one pneumatically and/or hydraulically operated further brake device for braking at least one further wheel of the vehicle; and at least one further control valve for controlling the brake pressure in the further brake device, wherein the brake control valve is further implemented to apply the brake pressure to the further brake device when the first brake pedal and/or the second brake pedal is actuated, and the switch module is implemented to further activate the further control valve when the first brake pedal and/or the second brake pedal is actuated in order to remove or at least reduce a braking effect of the further brake device.

4. The brake system as claimed in claims 2, wherein:

the brake control valve is implemented to apply the brake pressure to the first brake device and/or the second brake device via the first brake circuit and to apply the brake pressure to the further brake device via the second brake circuit.

5. The brake system as claimed in claim 1, wherein the switch module comprises:

a first control port that is electrically conductively connected to the first control valve, a second control port that is electrically conductively connected to the second control valve, a supply port for applying a supply voltage, a first switch that is mechanically coupled to the first brake pedal, and a second switch that is mechanically coupled to the second brake pedal, wherein the first switch is implemented to electrically conductively connect the second control port to the supply port when the first brake pedal is actuated in order to activate the second control valve, and the second switch is implemented to electrically conductively connect the first control port to the supply port when the second brake pedal is actuated in order to activate the first control valve.

6. The brake system as claimed in claim 3, wherein the switch module comprises:

a first control port that is electrically conductively connected to the first control valve, a second control port that is electrically conductively connected to the second control valve, a supply port for applying a supply voltage, a first switch that is mechanically coupled to the first brake pedal, and a second switch that is mechanically coupled to the second brake pedal, wherein the first switch is implemented to electrically conductively connect the second control port to the supply port when the first brake pedal is actuated in order to activate the second control valve, and the second switch is implemented to electrically conductively connect the first control port to the supply port when the second brake pedal is actuated in order to activate the first control valve.

7. The brake system as claimed in claim 6, wherein the switch module further comprises:

at least one further control port that is electrically conductively connected to the further control valve and/or a trailer control valve for controlling the brake pressure in a pneumatically and/or hydraulically operated trailer brake device for braking the trailer of the vehicle, wherein the first switch is implemented to electrically conductively connect the further control port to the supply port when the first brake pedal is actuated, and the second switch is implemented to electrically conductively connect the further control port to the supply port when the second brake pedal is actuated in order to activate the further control valve and/or the trailer control valve in order to remove or at least reduce a braking effect of the trailer brake device.

8. The brake system as claimed in claim 7, further comprising:

at least one trailer switch disposed between the further control port and the trailer control valve for controlling a voltage supply of the trailer control valve.

9. The brake system as claimed in claim 8, further comprising:

a first diode with a conducting direction from the first control port to the further control port disposed between the first control port and the further control port; and a second diode with a conducting direction from the second control port to the further control port disposed between the second control port and the further control port.

10. The brake system as claimed in claim 7, further comprising:

a first diode with a conducting direction from the first control port to the further control port disposed between the first control port and the further control port; and a second diode with a conducting direction from the second control port to the further control port disposed between the second control port and the further control port.

11. The brake system as claimed in claim 5, wherein:

the first switch and the second switch are connected in series, the second switch is implemented to electrically conductively connect the second control port to the first switch with the second brake pedal in a rest position, and the first switch is implemented to electrically conductively connect the first control port to the second switch with the first brake pedal in a rest position.

12. The brake system as claimed in claim 8, wherein:

the first switch and the second switch are connected in series, the second switch is implemented to electrically conductively connect the second control port to the first switch with the second brake pedal in a rest position, and the first switch is implemented to electrically conductively connect the first control port to the second switch with the first brake pedal in a rest position.

13. The brake system as claimed in claim 1, further comprising:

a control unit for controlling a voltage supply of the switch module, wherein the control unit is implemented to interrupt the voltage supply if at least one of: (i) the vehicle exceeds a predetermined speed, (ii) the vehicle exceeds a predetermined tilt angle, (iii) a differential lock of the vehicle is activated, and (iv) a trailer is coupled to the vehicle.

14. A method for operating a brake system as claimed in claim 1, wherein the method comprises one or more of the following steps:
  (1) outputting a control signal to the second control valve through the switch module if the first brake pedal is actuated in order to remove or at least reduce the braking effect of the second brake device, and
  (2) outputting the control signal to the first control valve through the switch module if the second brake pedal is actuated in order to remove or at least reduce the braking effect of the first brake device.

\* \* \* \* \*